United States Patent
Aoki et al.

[11] Patent Number: 6,101,763
[45] Date of Patent: *Aug. 15, 2000

[54] MOLDED FERTILIZER AND PROCESS OF FERTILIZING

[75] Inventors: Hiroshi Aoki, Kitakyushu; Yukio Chiwaki, Tokyo; Katsutoshi Ogihara, Sapporo, all of Japan

[73] Assignee: Mitsubishi Chemical Corporation, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 09/201,659

[22] Filed: Dec. 1, 1998

[30] Foreign Application Priority Data

Dec. 2, 1997 [JP] Japan .................................. 9-331514

[51] Int. Cl.$^7$ .............. A01C 21/00; C05C 9/00; C05G 5/00
[52] U.S. Cl. .................. 47/58.1; 71/28; 71/64.13
[58] Field of Search ............. 71/64.01, 64.13, 71/28, 64.03; 249/52; 47/58; 425/DIG. 37, DIG. 16

[56] References Cited

U.S. PATENT DOCUMENTS

| | | | |
|---|---|---|---|
| 2,019,824 | 5/1935 | Liehr et al. | 71/64.13 |
| 2,117,808 | 5/1938 | Jones | 71/64.13 |
| 3,467,609 | 9/1969 | Adams et al. | 71/64.13 |
| 3,543,438 | 12/1970 | Edwards | 71/64.13 |
| 4,052,190 | 10/1977 | Berliner | 71/11 |
| 5,549,730 | 8/1996 | Aoki et al. | 71/64.03 |

*Primary Examiner*—Steven P. Griffin
*Assistant Examiner*—Maribel Medina
*Attorney, Agent, or Firm*—Oblon, Spivak, McClelland, Maier & Neustadt, P.C.

[57] ABSTRACT

A molded fertilizer prepared by molding a fertilizer component, wherein the molded fertilizer has a secant line on the surface.

6 Claims, 1 Drawing Sheet

MOLDED FERTILIZER AND PROCESS OF FERTILIZING

BACKGROUND OF THE INVENTION

1. Field of the Invention

The present invention relates to a molded fertilizer which improves plant growth by actively facilitating plant roots so as to spread over the molded fertilizer or to wrap the molded fertilizer.

2. Discussion of Background

Heretofore, in the field of gardening, tree planting or afforestation, there have been widely used fertilizers molded by a tablet-making molding machine or a briquetting machine in view of their persistent fertilizer effect or convenience in easy handling. For example, there have been known a molded fertilizer prepared by compression-molding isobutylidene diurea with a roll press, which is one of reaction products of urea and aldehydes (JP-B-54-24942) and a molded fertilizer prepared by tablet-making (U.S. Pat. No. 5,549,730). When these molded fertilizers having a persistent fertilizer effect are applied on plants, nutrient elements present in the vicinity of the surfaces of the molded fertilizers are gradually reduced at the latter stage of growth, and there is a phenomenon that the plants grow by making their roots wrap the molded fertilizers since fertilizer nutrient elements are present in the center part of the molded fertilizers.

An object of the present invention is to provide a molded fertilizer for gardening, tree planting or afforestation, which improves the growth of a plant by actively facilitating its roots to spread over or to wrap the molded fertilizer.

In order to achieve this object, the present inventors have intensively studied and discovered that an unexpectedly marvelous effect can be achieved by providing a secant line on the surface of a molded fertilizer, and the present invention has been accomplished on the basis of this discovery.

SUMMARY OF THE INVENTION

The essential feature of the present invention resides in a molded fertilizer prepared by molding a fertilizer component, wherein the molded fertilizer has a secant line on the surface.

DETAILED DESCRIPTION OF THE INVENTION

Figure 1:
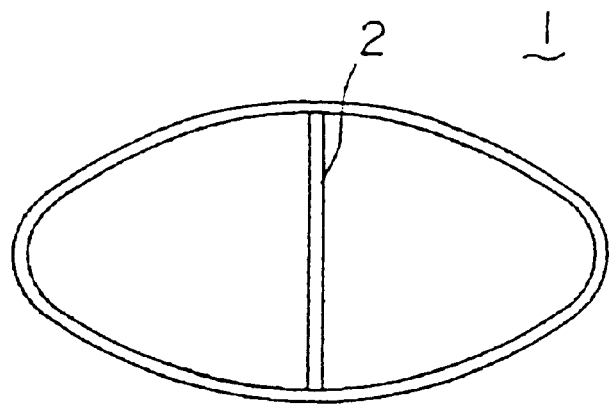
FIG. 1 is a plan view of a molded fertilizer prepared in Example.

A fertilizer component used in the present invention is not specially limited, examples of which are illustrated below. Examples of a nitrogen fertilizer slightly soluble in water, which is a reaction product of urea and an aldehyde having a carbon number of at most 4, include reaction products of urea with an aldehyde having a carbon number of at most 4, such as isobutyraldehyde, n-butyraldehyde, propionaldehyde, crotonaldehyde, acetaldehyde or formaldehyde, or their mixture. More concrete examples include isobutylidene diurea, n-butylidene diurea, propylidene diurea, crotonylidene diurea, ethylidene diurea, and a reaction product of urea with formaldehyde, which has a solubility in water at the same degree as isobutylidene diurea. Examples of other fertilizer components include ammonium sulfate, urea, ammonium nitrate, ammonium chloride, ammonium phosphate, superphosphate of lime, triple superphosphate of lime, fused phosphate fertilizer, processed phosphate fertilizer, potassium sulfate, potassium chloride, potassium silicate and the like. The fertilizer component slightly soluble in water may be used alone or in a mixture with other fertilizer components depending appropriately on a plant, to which the fertilizer is applied.

A method for molding is not specially limited so long as an aimed size and a shape-maintaining property can be obtained, but usually a roll type molding machine (briquet machine), a tablet-making molding machine (tablet machine) or the like is used. A molded product may have an optional shape. The size of the molded product is not specially limited, but it is usually appropriate that the molded product has a side or a diameter of at least 4 mm, preferably from 8 mm to 40 mm.

At the time of molding, in order to enhance molding properties, various binders or release agents may be added.

A secant line can be easily provided on the surface of a molded product by using a molding machine provided with a mold having a convex line. The shape and the number of the secant line are not specially limited, but even a secant line of one straight line can achieve the aimed effect of improving the growth of a plant by facilitating spreading or wrapping of plant roots. However, it is preferable that the area ratio of the secant line is in the range of from 0.001 to 50 cm$^2$/100 cm$^2$ of the surface area of the molded product.

Further, by providing a secant line on the surface of a molded fertilizer, it becomes easy to divide the molded fertilizer, and it becomes also easy to adjust the amount of the fertilizer to be applied.

EXAMPLE

The present invention is further illustrated with reference to the following Example and Comparative Example, but the present invention should not be limited thereto as far as the essential feature is within the scope of the present invention.

The term "part" used herein means "part by weight".

Example and Comparative Example

222 Parts of isobutylidene diurea powdery particles having a particle size of 0.2–0.7 mm (tradename "IBDU" manufactured by Mitsubishi Chemical Corporation), 65 parts of ammonium sulfate passed through a sieve of 1 mm, 275 parts of processed phosphate fertilizer powdery particles (tradename "LINSTAR" manufactured by Mitsubishi Chemical Corporation) pulverized and passed through a sieve of 1 mm and 413 parts of potassium silicate powdery particles passed through a sieve of 1 mm were mixed. To the resultant mixture, were added 0.4 wt % of magnesium stearate, 1 wt % of inorganic salts of lignin sulfonic acid (tradename "SUN-EKIS" manufactured by Nihon Seishi K.K.), 0.6 wt % of talc and 0.5 wt % of water.

By using a tablet-making machine manufactured by Kikusui Seisakusho K.K., a molded product was prepared so as to provide an elliptical tablet having a longer diameter of 23 mm, a shorter diameter of 11.5 mm, a thickness of 0.63 mm and a weight of 2 g and having a wedge-shaped secant line of a depth of 0.35 mm in the shorter diameter direction at the central part of the elliptical tablet. FIG. 1 is a plan view illustrating the molded fertilizer (1) thus prepared, and FIG.

Figure 2:
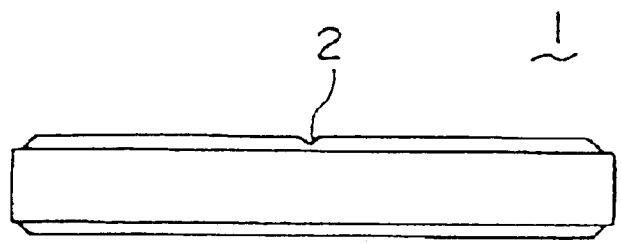
FIG. 2 is a front view of a molded fertilizer prepared in Example.
Figure 3:
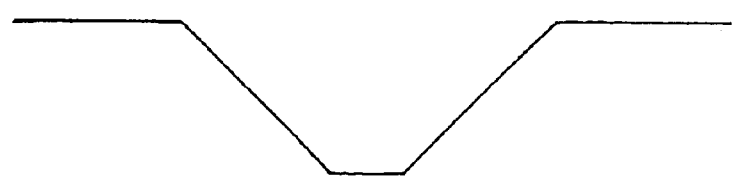
FIG. 3 is an enlarged view of a secant line of a molded fertilizer prepared in Example.

2 is a front view, wherein 2 indicates a secant line. Also, FIG. 3 is an enlarged view illustrating the secant line of FIG. 2.

For comparison, a comparative molded fertilizer was prepared so as to provide an elliptical tablet having a longer diameter of 23 mm, a shorter diameter of 11.5 mm, a thickness of 0.63 mm and a weight of 2 g without providing a secant line.

One piece of each of the above prepared molded fertilizers with a secant line or without a secant line was applied to one stock of seedling of binka on June 11, and 12 stocks were cultivated in each planter having water irrigated into the bottom (tradename "Hanasakirakuda" manufactured by DIA-TOPI K.K.).

On September 16, each of the molded fertilizers with a secant line and without a secant line was taken out from each planter without breaking the spread or wrapped state of roots, and their weights were measured. The results are shown in the following Table 1. The weights shown in the following Table 1 include roots wrapping the fertilizers. It is evident from the following results that the fertilizers with secant lines actively cause phenomena of root wrapping.

TABLE 1

| Sample | Weight (including roots) | Average value |
| --- | --- | --- |
| With secant lines | 9.4 g, 4.5 g, 12.2 g, 14.1 g, 13.9 g, 14.2 g, 14.8 g, 12.0 g, 11.5 g, 16.2 g, 10.5 g, 10.5 g | 12.0 g |
| Without secant lines | 3.2 g, 2.2 g, 8.3 g, 2.9 g, 11.6 g, 4.5 g, 8.6 g, 2.4 g, 7.7 g, 6.3 g, 4.9 g, 7.2g | 5.8 g |

As mentioned above, the molded fertilizer having a secant line of the present invention get roots of a plant more wrapped the fertilizer and improves the growth of a plant.

What is claimed is:

1. A process of fertilizing comprising applying a molded fertilizer prepared by molding a fertilizer component, to a plant, wherein the molded fertilizer has a secant line on the surface provided by a mold of a molding machine, and wherein the fertilizer component is slightly soluble in water and is a reaction product of urea and an aldehyde having a carbon number of at most 4, and wherein said secant line has an effect of enhancing root growth of said plant.

2. The process according to claim 1, wherein the molded fertilizer units have a side or a diameter of at least 4 mm.

3. The process according to claim 2, wherein the molded fertilizer units have a side or a diameter of from 8 mm to 40 mm.

4. The process according to claim 1, wherein the area of the secant line part is in the range of from 0.001 to 50 $cm^2$ per 100 $cm^2$ of the total area of the molded fertilizer.

5. The process according to claim 1, wherein the secant line is provided by molding the fertilizer component with a molding machine provided with a mold having a convex line.

6. A process comprising, in the following order:
(1) selecting a dose of fertilizer for a particular fertilizer application;
(2) selecting a number of molded fertilizer units necessary for said dose;
(3) applying a secant line on a surface of each of said molded fertilizer units using a molding machine; and
(4) applying the molded fertilizer units containing a secant line in the selected dose to a plant, wherein said molded fertilizer containing said secant line enhances plant and root growth at a rate greater than the rate of enhancing plant and root growth provided by said molded fertilizer without said secant line.

* * * * *